(12) United States Patent
Bodkin

(10) Patent No.: US 7,796,316 B2
(45) Date of Patent: Sep. 14, 2010

(54) MICRO-OPTIC SHUTTER

(75) Inventor: Andrew Bodkin, Wellesley, MA (US)

(73) Assignee: Bodkin Design and Engineering LLC, Newton, MA (US)

( * ) Notice: Subject to any disclaimer, the term of this patent is extended or adjusted under 35 U.S.C. 154(b) by 360 days.

(21) Appl. No.: 11/933,241

(22) Filed: Oct. 31, 2007

(65) Prior Publication Data
US 2008/0112029 A1 May 15, 2008

Related U.S. Application Data

(60) Continuation-in-part of application No. 11/437,085, filed on May 19, 2006, now abandoned, which is a division of application No. 10/325,129, filed on Dec. 20, 2002, now Pat. No. 7,049,597.

(60) Provisional application No. 60/344,130, filed on Dec. 21, 2001.

(51) Int. Cl.
G02B 26/02 (2006.01)
(52) U.S. Cl. .................... 359/233; 359/227; 359/230
(58) Field of Classification Search ............ 359/227, 359/230, 233
See application file for complete search history.

(56) References Cited

U.S. PATENT DOCUMENTS

| | | | |
|---|---|---|---|
| 3,698,812 A | 10/1972 | Nelson | |
| 4,175,844 A | 11/1979 | Glaser-Inbari | |
| 4,561,775 A | 12/1985 | Patrick et al. | |
| 4,708,420 A | 11/1987 | Liddiard | |
| 4,754,139 A | 6/1988 | Ennulat et al. | |
| 5,136,312 A | 8/1992 | Weaver et al. | |
| 5,168,528 A | 12/1992 | Field | |
| 5,191,469 A | 3/1993 | Margolis | |
| 5,239,179 A | 8/1993 | Baker | |
| 5,583,340 A | 12/1996 | Grossman | |
| 5,760,398 A | 6/1998 | Blackwell et al. | |
| 5,763,882 A | 6/1998 | Klapper et al. | |
| 5,825,029 A | 10/1998 | Agnese et al. | |
| 5,841,574 A | 11/1998 | Willey | |
| 5,877,500 A | 3/1999 | Braig et al. | |
| 5,963,749 A | 10/1999 | Nicholson | |
| 6,178,346 B1 | 1/2001 | Amundson et al. | |

(Continued)

OTHER PUBLICATIONS

Sheinis,A.I. et al., "Integral Field Unit for the Echellete Spectrograph and Imager at Keck II", 4841 Proc. of SPIE, 1078-85 (2003).

(Continued)

*Primary Examiner*—James Phan
(74) *Attorney, Agent, or Firm*—Lathrop & Gage LLP

(57) ABSTRACT

A shutter includes micro-optics having first and second concentrator arrays. A transducer laterally displaces one of the first and second concentrator arrays between transmissive and shuttered modes. In the transmissive mode, the arrays of concentrators are optically aligned to permit electromagnetic energy passing through the first array of concentrators to pass through the second array of concentrators. In the shuttered mode, the electromagnetic radiation is blocked from passing through the second array of concentrators. The concentrators may be compound parabolic concentrators, or lenslets positioned on opposing plates with pinholes printed therethrough. The shutter may increase f-number of radiation passing therethrough, and may be used in a limited f-cone radiation source with shuttering abilities, for example reducing f-cone of radiation output from the radiation source.

20 Claims, 16 Drawing Sheets

U.S. PATENT DOCUMENTS

| | | | |
|---|---|---|---|
| 6,362,872 | B1 | 3/2002 | Berdanier |
| 6,444,984 | B1 | 9/2002 | Lundgren et al. |
| 6,549,828 | B1 | 4/2003 | Garrot et al. |
| 6,665,116 | B1 | 12/2003 | Harvey et al. |
| 6,756,594 | B2 | 6/2004 | George et al. |
| 6,781,127 | B1 | 8/2004 | Wolff et al. |
| 2001/0045516 | A1 | 11/2001 | Emanuel et al. |
| 2002/0180866 | A1 | 12/2002 | Monroe |
| 2003/0174238 | A1 | 9/2003 | Wu |
| 2003/0202177 | A1 | 10/2003 | Reznichenko et al. |
| 2004/0090623 | A1 | 5/2004 | Richman |
| 2004/0119020 | A1 | 6/2004 | Bodkin |
| 2004/0233498 | A1* | 11/2004 | Starkweather et al. ...... 359/230 |
| 2004/0238724 | A1 | 12/2004 | Moody et al. |
| 2004/0252992 | A1 | 12/2004 | Hunter |
| 2005/0023445 | A1 | 2/2005 | Horn et al. |
| 2005/0041144 | A1 | 2/2005 | Mitchell et al. |
| 2006/0208193 | A1 | 9/2006 | Bodkin |

OTHER PUBLICATIONS

Bacon R., et al., "3D Spectrography at High Spatial Resolution", 113 Astron. Astrophys. Suppl. Ser. 347-57 (1995).

Goetz, A.F.H. et al., Imaging Spectrometry for Earth Remote Sensing, Science, New Series, vol. 228, No. 4704 (Jun. 7, 1985), pp. 1147-1153.

Content, R., "New Design for Integral Field Spectroscopy with 8-m Telescopes", 2871 Proc. of SPIE 1295-1305 (1997).

Sheinis, A.I., et al., "ESI, a new Keck Observatory echellette spectrograph and imager", 114 Pub. Of Astronomical Society of the Pacific, 851-865 (2002).

Esplin et al., "SABER Instrument Design Update", 2553 Proc. of SPIE, 253-63 (1995).

Cayla et al., "IASA Instrument Overview", 2553 Proc. of SPIE, 316-328 (1995).

Bacon et al., "The Integral Field Spectrograph TIGER", 1988 vltt. Conf. 1185B, pp. 1185-1194.

Sheinis et al., "Performance Characteristics of the new Keck Observatory echelle spectrograph and imager", 4008 Proc. SPIE, 522-533 (2000).

Selected File History from Aug. 11, 2006 through Jan. 28, 2008, for related U.S. Appl. No. 11/437,085, 42 pages.

Selected File History from Feb. 11, 2005 through Dec. 29, 2005 for related U.S. Appl. No. 10/325,129, 64 pages.

* cited by examiner

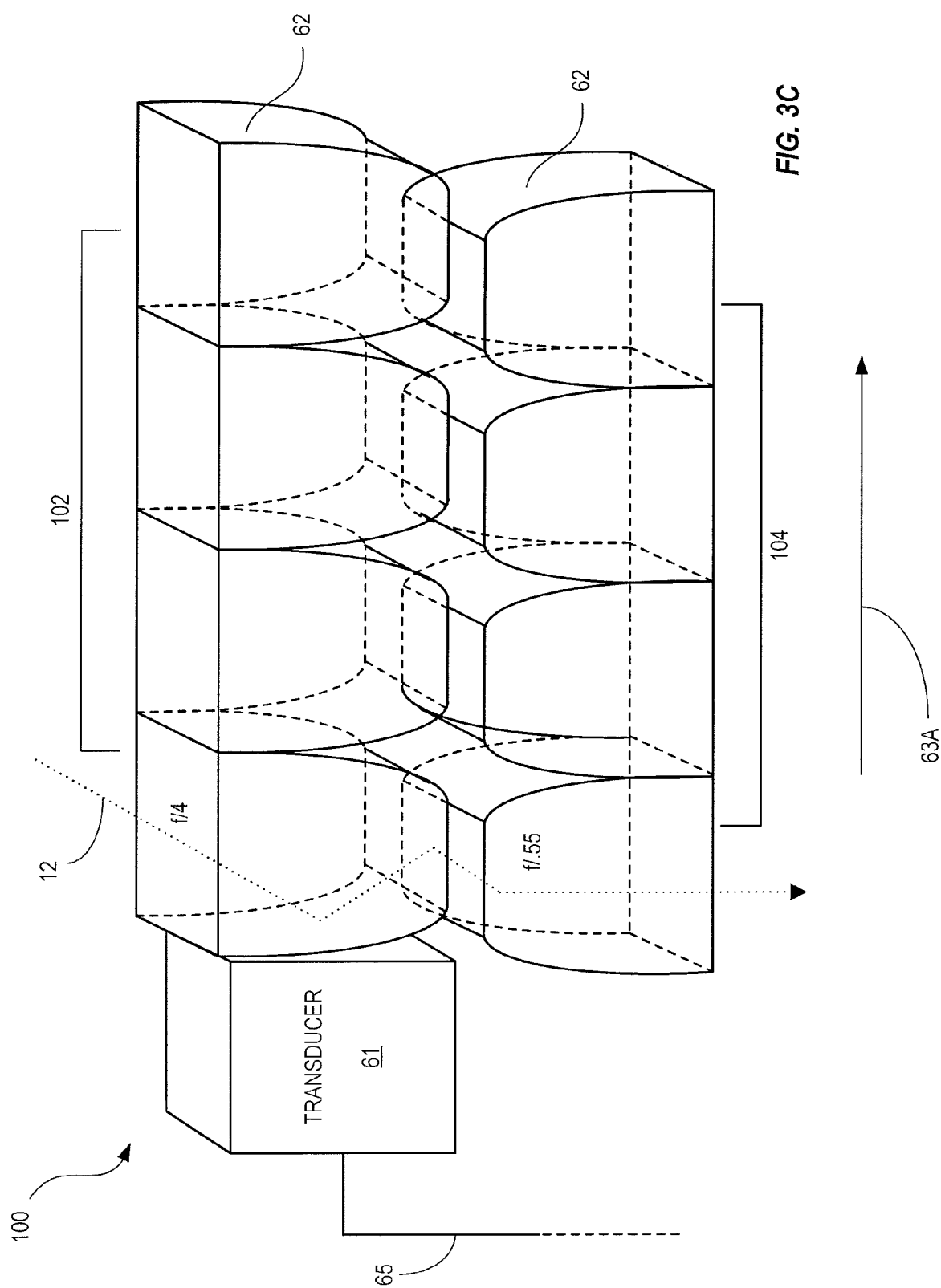

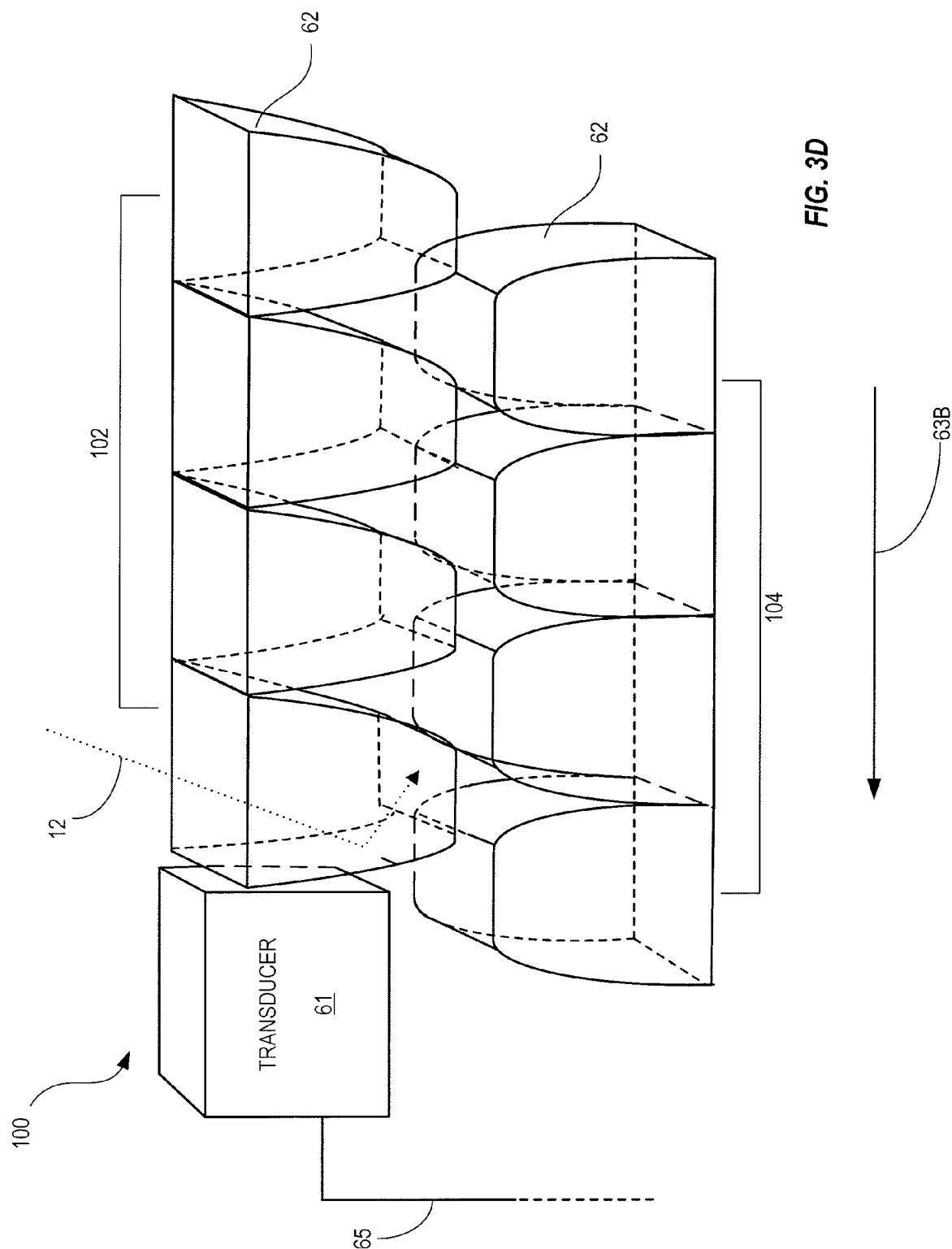

MICRO-OPTIC SHUTTER

RELATED APPLICATIONS

This application is a continuation-in-part of U.S. patent application Ser. No. 11/437,085, filed May 19, 2006, now abandoned which is a divisional of U.S. application Ser. No. 10/325,129 now filed Dec. 20, 2002 U.S. Pat. No. 7,049,597, issued May 23, 2006, which claims priority to U.S. Provisional Patent Application 60/344,130, filed Dec. 21, 2001. The above-identified related applications are hereby incorporated by reference in their entirety as though fully set forth herein.

BACKGROUND

Shutters are known in the art for blocking or allowing transmission of light. However, current shutters suffer from limited efficiency and limited function.

SUMMARY

The shutter disclosed herein may provide efficient shuttering in combination with f-number reduction. Such a shutter is for example used with a multi-mode or other optical imager, or in a limited f-cone light source.

In one embodiment, a micro-optic shutter includes micro-optics having first and second arrays of concentrators. A transducer laterally displaces at least one of the first and second concentrator arrays between a transmissive mode and a shuttered mode. In the transmissive mode, the arrays of concentrators are optically aligned to pass electromagnetic energy through the micro-optics. In the shuttered mode, the micro-optics blocks the electromagnetic radiation from passing therethrough.

In one embodiment, a micro-optic shutter includes a first plate forming a first array of pinholes extending therethrough and a corresponding array of first refractive lenslets adjacent the first array of pinholes. A second plate forms a second pinhole array extending therethrough. A corresponding array of second refractive lenses are on a second side of the second plate and beneath the second pinholes. A transducer laterally displaces one of the first and second plates between a transmissive mode and a shuttered mode. In the transmissive mode, electromagnetic energy focuses through the first and second array of pinholes by refractive power of the first refractive lenses. In the shuttered mode, the electromagnetic energy is blocked in transmission through the arrays of lenses by one or both of the plates.

In one embodiment, a limited f-cone light source has a source for emitting radiation and micro-optics positioned adjacent the source and having an array of concentrators, for slowing the radiation emitted from the light source.

BRIEF DESCRIPTION OF DRAWINGS

FIG. 3C is a perspective view illustrating a shutter with dual concentrator arrays in a light transmissive mode.

FIG. 3D is a perspective view of the shutter of FIG. 3C in a shuttered mode.

DETAILED DESCRIPTION OF DRAWINGS

Figure 1:
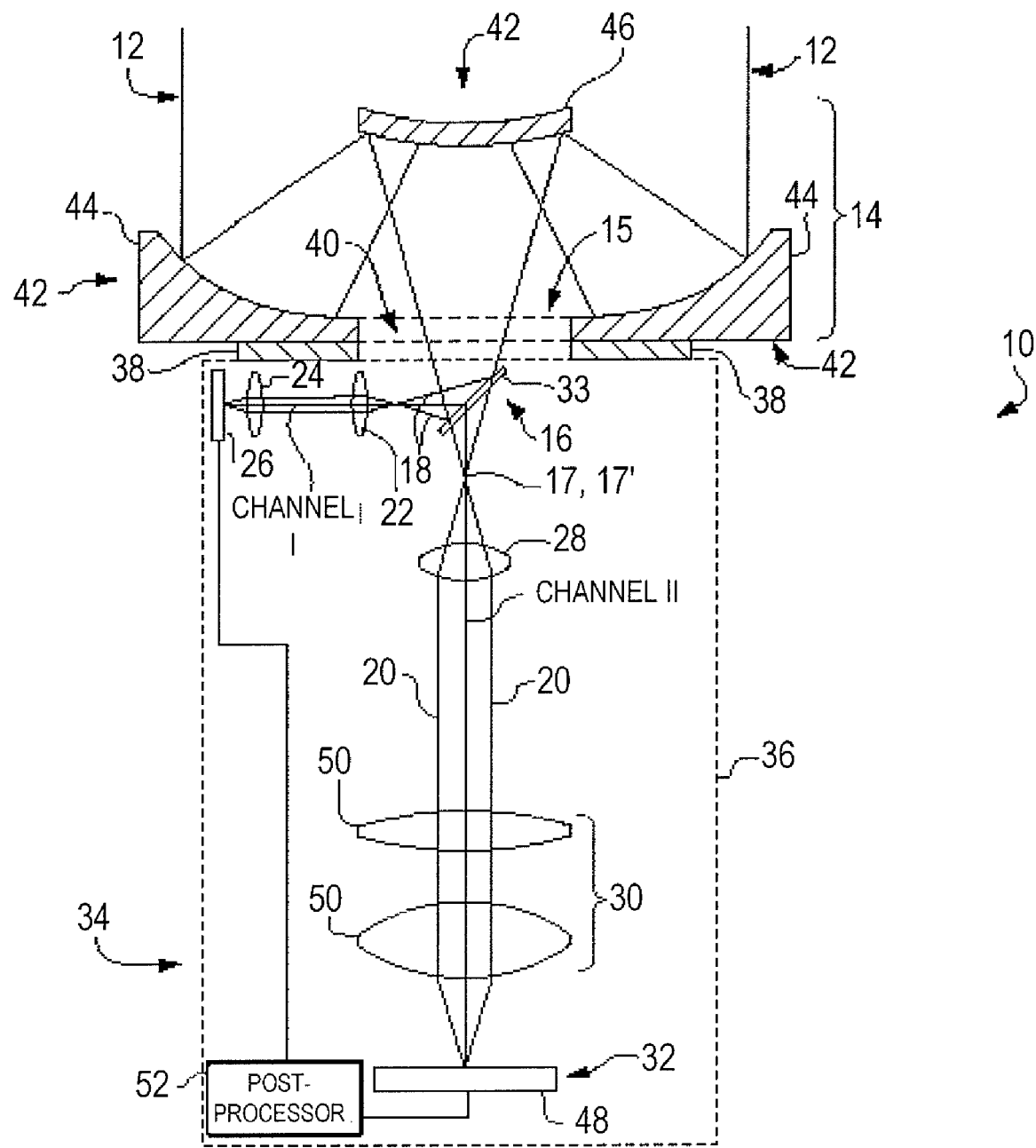
FIG. 1 is a schematic front view of one multi-mode optical imager.

FIG. 1 shows one common aperture multi-mode optical imager 10 for imaging electromagnetic radiation 12 encompassing two or more wavelength regions, such as visible light and infrared radiation. Fore-optics 14 magnify and direct electromagnetic radiation 12 into a common aperture 15 of multi-mode optical imager 10; a focal point 17 of fore-optics 14 is seen in FIG. 1. A filter or beam-splitter 16, positioned after the common aperture 15, divides electromagnetic radiation 12 into a visible light wavelength band 18 and an infrared wavelength band 20. Visible light wavelength band 18 is illustratively shown aligned along channel I and infrared wavelength band 20 is illustratively shown aligned along channel II. Channel I and channel II represent, respectively, optical axes along which visible wavelength band 18 and infrared wavelength band 20 are processed. For example, visible light wavelength band 18 is directed along channel I through a first field lens 22 and a magnifying or zoom lens 24 to a first optical detector 26 (or alternatively to a camera that detects visible light wavelength band 18). Infrared wavelength band 20 is directed along channel II through a second lens 28 (e.g., a second field lens) and an f-number reducer 30 to a second optical detector 32 (or alternatively to a camera that detects long-wave infrared wavelength band 20). Detection of visible light wavelength band 18 and infrared wavelength band 20, by first optical detector 26 and second optical detector 32, respectively, may be in the form of a still image at a certain point of time (i.e., when a shutter (not shown) opens, and subsequently closes, over common aperture 15 to allow electromagnetic radiation 12 therethrough) or a stream of video over a period of time.

In one embodiment, beam-splitter 16 (e.g., a dichroic beam-splitter 33) divides electromagnetic radiation 12 entering through common aperture 15 into visible light and infrared wavelength bands 18, 20, respectively, along channels I and II. First field lens 22 and zoom lens 24 provide magnification capabilities for the visible spectrum imaging of visible light wavelength band 18 with first optical detector 26. First field lens 22 directs visible light wavelength band 18 traveling from beam-splitter 16 to zoom lens 24, which focuses visible light wavelength band 18 onto first optical detector 26; zoom lens 24 facilitates zoom functionality to increase or decrease the magnification of the visible image captured by detector 26, selectably. First optical detector 26 may be a CCD or CMOS array, or other detector sensitive to visible light. Infrared wavelength band 20 is directed by second lens 28 traveling from beam-splitter 16 to optics of f-number reducer 30; f-number reducer 30 reduces the f-number of infrared wavelength band 20 prior to second optical detector 32. F-number reducer 30 may also be configured to provide zoom function to increase or decrease the magnification of the infrared image captured by the detector 32. Beam-splitter 16, first field lens 22, zoom lens 24, first optical detector 26, second lens 28, f-number reducer 30 and second optical detector 32 may be combined into an imaging module 34 that couples with various fore-optics (e.g., fore-optics 14) to capture and produce final images of electromagnetic radiation 12. A housing 36 encases the components of imaging module 34. First optical detector 26 and second optical detector 32 may, of course, be configured for sensitivity to wavebands other than visible light and infrared as a matter of design choice, depending on the desired image characteristics to be detected by multi-mode optical imager 10. For example, other wavebands may include ultraviolet, near infrared and millimeter waves. These wavebands may be configured and processed in place of bands 18 and/or 20, for example. Accordingly, multiple imaging modules 34 may include, for example, channels I and II that process preselected wavebands, wherein a user "swaps out" imaging module 34 with another module 34 to capture and image the desired electromagnetic spectrum 12.

Housing 36 may be configured with an interface 38 for attachment of varying fore-optics 14; such fore-optics 14 may provide a wide field of view, a narrow field of view, or any range therebetween, as a matter of design choice. In this way, housing 36 may accept fore-optics 14 that can be interchanged to alter multi-mode optical imager 10 focal length and zoom capabilities, and may thereby form, for example, a microscope or a telescope having a low f-number. A virtual focal plane 40 of fore-optics 14 is thus formed at interface 38, and the location of focal point 17 within imaging module 34 may be controlled by the particular optical properties of fore-optics 14. Furthermore, by this interface 38, various imaging modules 34 having differing imaging characteristics—imaging ultraviolet and midwave infrared wavebands (3-5 µm), in one example—may be interchanged with fore-optics 14 to provide custom configuration in multiple bandwidth imaging with multi-mode optical imager 10.

In one embodiment, fore-optics 14 are formed of broad band curved reflectors 42, such as convex and/or concave mirrors, capturing a real image 17' of electromagnetic radiation 12. Reflective surfaces of reflectors 42 have a number of advantages over traditional refractive lenses when used with multi-mode optical imager 10. First, refractive lenses have indexes of refraction that change drastically between differing wavelengths of electromagnetic radiation, such as visible light and LWIR, leading to complex optical designs in order to avoid misfocus in all of the wavebands. Secondly, the reflective surfaces of reflectors 42 have a shorter fore-optic length as compared to refractive lenses. Furthermore, the reflective surfaces of reflectors 42 provide the additional benefit of nearly identical optical properties across a broad spectrum of wavebands. The curved reflectors 42 gather the incident visible light and infrared wavebands of electromagnetic radiation 12 in a way as to provide the same optical power in both visible light and infrared wavebands, while avoiding the focusing problems of refractive lenses. In one example, the curved reflectors 42 may include a concave mirror 44 forming aperture 15, and a convex mirror 46. Incident electromagnetic radiation 12 reflects off of concave mirrors 44 and is directed to convex mirror 46, which then focuses radiation 12 through aperture 15 and into imaging module 34. The fore-optics 14 may for example be a Cassegrain mirrored telescope or a Newtonian mirrored telescope. Those of skill in the art will appreciate that other broad band fore-optics 14 may be chosen depending on the desired optical properties of the multi-mode optical imager 10. Electromagnetic radiation 12 is focused by fore-optics 14 at focal point 17 forming a real intermediate image plane.

After passing through dichroic beam-splitter 33, infrared wavelength band 20 encounters f-number reducer 30. In one exemplary arrangement, fore-optics 14 produces an f/4 beam of infrared wavelength band 20 prior to f-number reducer 30; however, this f-number fore-optics 14 is a matter of design choice. F-number reducer 30 provides magnification and f-number reduction so that, for example, second optical detector 32 of channel II may be an uncooled microbolometer array 48 to detect infrared wavelength band 20. The f-number reduction of reducer 30 increase the image signal reducing the effect of secondary radiation (creating noise) within the detected image at second optical detector 32, since secondary radiation may emanate from, for example, housing 36 of imaging module 34. In one embodiment, f-number reducer 30 reduces the infrared wavelength band 20 to have an f-number that is matched to the requirement of uncooled microbolometer array 48 (e.g., f/1). F-number reducer 30 may include a number of transmissive lenses, shown as a pair of lenses 50 in FIG. 1. As a matter of design choice, f-number reducer 30 may also or alternatively include fiber-optics (i.e., fiber optic bundle pulled to a taper), micro-optics located on uncooled microbolometer array 48 (see, e.g., micro-optics 58, FIGS. 3A, 3B), and/or other optics to provide magnification and f-number reduction. Lenses 50 of f-number reducer 30 may be fabricated of various optical materials, such as germanium, zinc selenide, calcium fluoride or AMTIR-1.

The production of high fidelity, broadband low f-number optics is known to be difficult. For this reason, f-number reducer 30 is positioned downstream from where infrared wavelength band 20 is divided off (i.e., downstream of beam-splitter 16) such that only infrared wavelength band 20 is affected. Additionally, because beam-splitter 16 (i.e., dichroic beam-splitter 33) and f-number reducer 30 each are designed to condition narrow wavebands, these conditioning optics can be relatively small—as compared to standard conditioning optics of the prior art—further lending to the lightweight and compact design of multi-mode optical imager 10.

A post-processor 52 may also be provided in imaging module 34. Post-processor 52 is coupled with first optical detector 26 and second optical detector 32 and may process digital image data representative of visible light and infrared wavelength bands captured by detectors 26, 32. Analysis by post-processor 52 may provide information about an object reflecting and/or emitting electromagnetic radiation 12, such as physical dimensions of the object, thermal energy emitted by the object, imaging characteristics of the object, etc.

Figure 2:
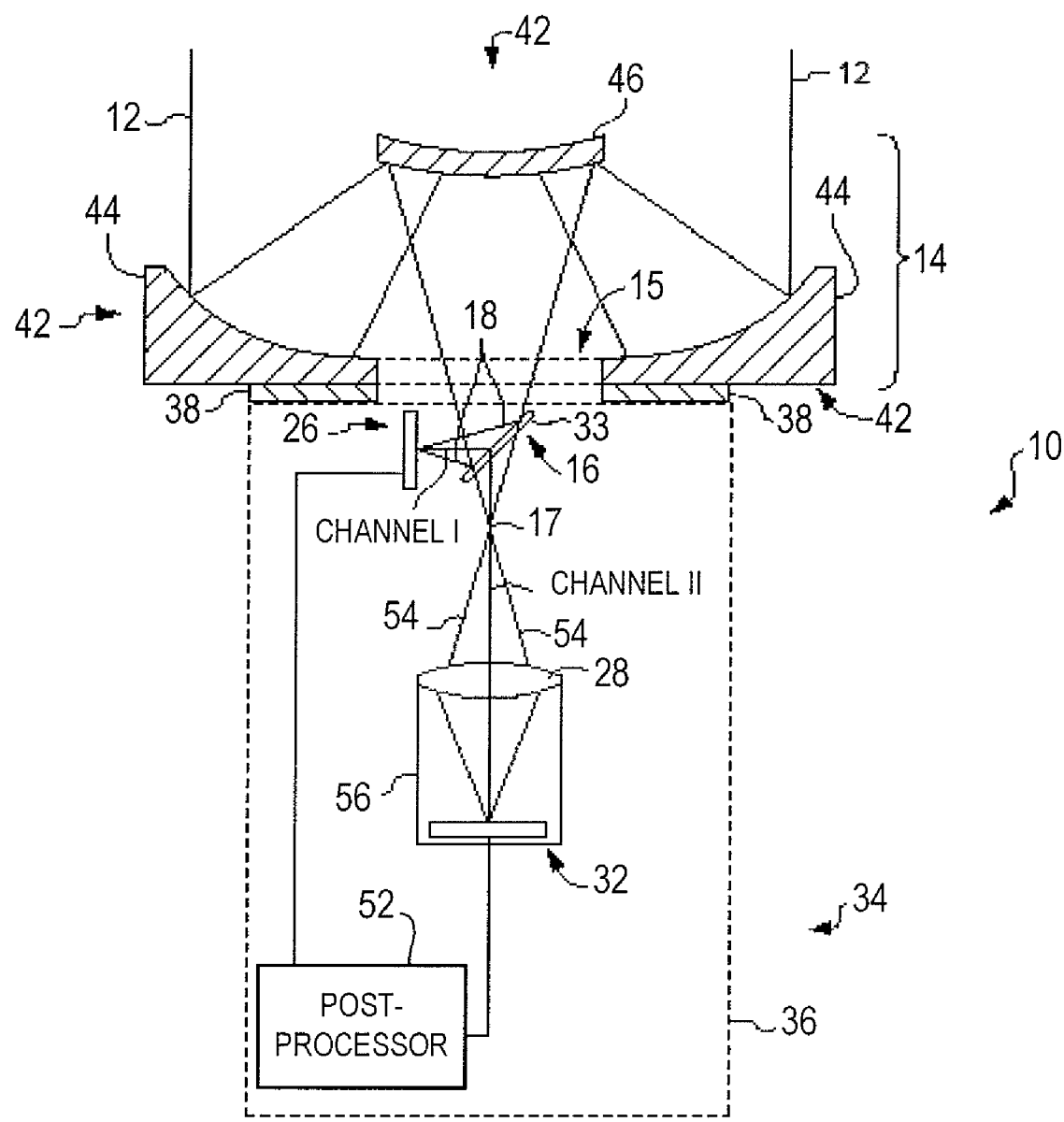
FIG. 2 is a schematic front view of another multi-mode optical imager.

FIG. 2 shows one embodiment of multi-mode optical imager 10 with visible light wavelength band 18 aligned along channel I and a midwave infrared wavelength band 54 aligned along channel II. Beam-splitter 16 divides electromagnetic radiation 12 entering through common aperture 15 into visible light and midwave infrared wavelength bands 18, 54, respectively, along channels I and II. Visible light wavelength band 18 is detected by first optical detector 26, and midwave infrared wavelength band 54 travels through second lens 28, which focuses band 54 onto second optical detector 32 for detection thereof. A cold shield 56 may extend between second lens 28 and second optical detector 32 to shield detector 32 from detecting electromagnetic radiation emitted within the housing 36 itself, ensuring accurate detection of the midwave infrared wavebands present in electromagnetic radiation 12. The second lens 28 may also be cooled, further reducing the self emission radiation of the camera from the detected image. A post-processor, such as post-processor 52, may be coupled with first optical detector 26 and second optical detector 32 and may process digital image data representative of visible light and midwave infrared wavelength bands captured by detectors 26, 32. Post-processor 52 may analyze reflected and/or emitted electromagnetic radiation 12 from an object to learn information about the object.

FIG. 1 and FIG. 2 collectively illustrate another feature provided by a multi-mode optical imager, in accord with one embodiment. Specifically, in the embodiment, midwave band 54 along channel II is "swapped" out with longwave band 20, FIG. 1, to change which spectra of radiation 12 is imaged. By way of example, lens 28, f-number reducer 30, and detector 32 (e.g., microbolometer array 48) of FIG. 1 may be removed as a module assembly and replaced by lens 28, cold shield 56 and detector 32 (e.g., a PtSi detector) of FIG. 2 within module 34 as a matter of user preference.

Figure 3A:
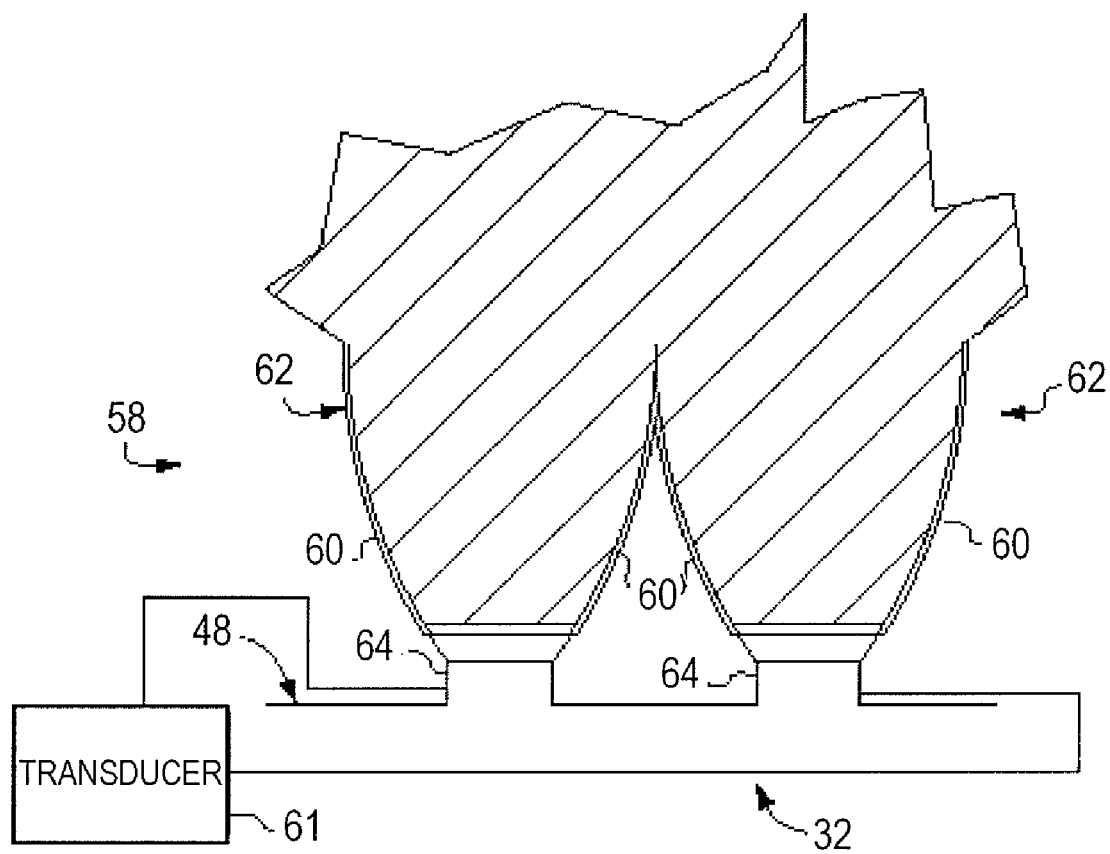
FIG. 3A is a front view showing compound parabolic concentrators in use with an optical detector.
Figure 3B:
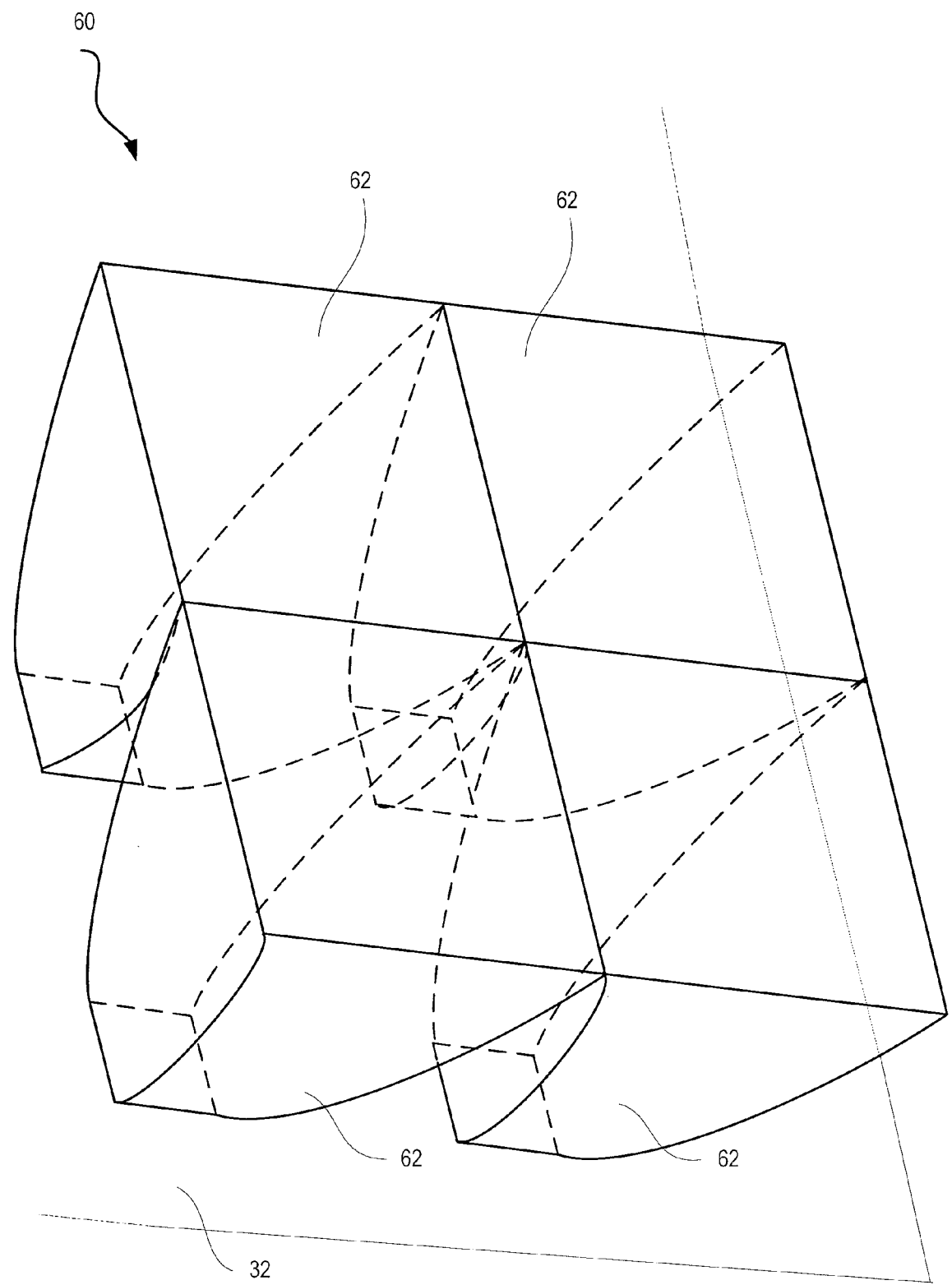
FIG. 3B is a perspective view of one array of compound parabolic concentrators.

Exemplary micro-optics 58 are illustrated in FIGS. 3A and 3B. An array of filled or solid concentrators 60, preferably forming a series of compound parabolic concentrators 62, are positioned adjacent to imaging pixels 64 of uncooled microbolometer array 48 (i.e., second optical detector 32). As shown in FIG. 3A, each compound parabolic concentrator 62 forms a generally conically-shaped mirror that may be fabricated from (or filled with) various materials, such as high index germanium that is transparent to 7-14 μm infrared radiation and that has a high optical index which tends to facilitate detection of infrared wavelength band 20 by imaging pixels 64. The optical function of the compound parabolic concentrators 62 increases the f-cone, and consequently reduces the f-number of the incident infrared radiation at the imaging pixels 64.

Accordingly, compound parabolic concentrators 62 may provide certain advantages as compared to the prior art, including: permitting use of smaller lenses within multi-mode optical imager 10 to produce the desired f-number at the uncooled microbolometer array 48; and reducing the size of imaging pixels 64 to increase the signal-to-noise ratio of multi-mode optical imager 10, making imager 10 more sensitive to LWIR of radiation 12. Moreover, by shifting the series of compound parabolic concentrators 62 directly off of imaging pixels 64 (i.e., adjacent to the pixels), the infrared wavelength band 20 is effectively "shuttered", aiding in calibration of multi-mode optical imager 10 (the illustrated concentrators may also be used generally for shuttering, as described below). Concentrators 60 may be an array of hollow tapered capillaries, e.g., including an inner reflective coating. One or more of fiber optic tapers, refractive lens elements and reflective elements may also serve as concentrators 60.

As shown in FIGS. 3C-3D, micro-optics 58 may include a dual array of concentrators coupled with a transducer 61, to provide shutter capability. Concentrators 62 may also be provided on opposing plates (see, e.g., FIGS. 4A and 4B), with one or both of the plates coupled with the transducer. Referring again to FIG. 3B, compound parabolic concentrators 62 are for example solid filled concentrators. Filled concentrators may improve surface reflectivity and increase structural soundness of shutter 100, FIG. 3C. Hollow concentrators 62 with a reflective coating may alternatively be used.

To illustrate how concentrators may be used in shuttering, consider FIGS. 3C and 3D in more detail. In FIG. 3C, a first array 102 of concentrators 62 is positioned over a second array 104 of concentrators 62 in a transmissive mode. In transmissive mode, electromagnetic radiation 12 entering first array 102 is directed into second array 104. As shown, f-number of electromagnetic radiation 12 entering first array 102 is reduced, for example from f/4 upon entry to f/0.55 upon exit from first array 102 and second array 104. Transducer 61 laterally shifts first array 102 (or second array 104), e.g., in the direction of arrow 63A, to effect a shuttered mode, as shown in FIG. 3D. In the shuttered mode, light entering first array 102 is blocked from second array 104. The taper of reflective concentrators 62 allows transition between transmissive and shuttering modes with minimal movement (enabled by transducer 61). Shutter 100 is efficient, since transducer 61 need only shift first or second array 102, 104 a distance equal to the smallest diameter of concentrators 62 to achieve shuttering. Transducer 61 is for example a piezoelectric element that expands and contracts, e.g., under control of imager 10 (e.g., processor 52), to shift first or second array 102, 104; control of transducer 61 is for example enabled via a control line 65 that applies a voltage to shutter 100. Arrays 102, 104 may be positioned adjacent a lens such as first or second lens 22, 28, or in front of a detector element such as first or second detector 26, 32 (FIGS. 1, 2), to provide selective shuttering, for example.

Similar to these compound parabolic concentrators 62, shutter 100 may be enabled by dual arrays of hollow tapered capillaries (not shown) with a reflective material coated on an inner surface or surfaces of the hollow tapered capillaries. Alternately, shutter 100 may include one or more of a fiber optic taper, one or more alternate or additional reflective elements, and refractive lens elements. Refractive lenses may for example be made with high-index germanium where infrared radiation is transmitted or shuttered, or with plastic (i.e., plastic filled) where LED light is transmitted or shuttered.

Figure 4A:
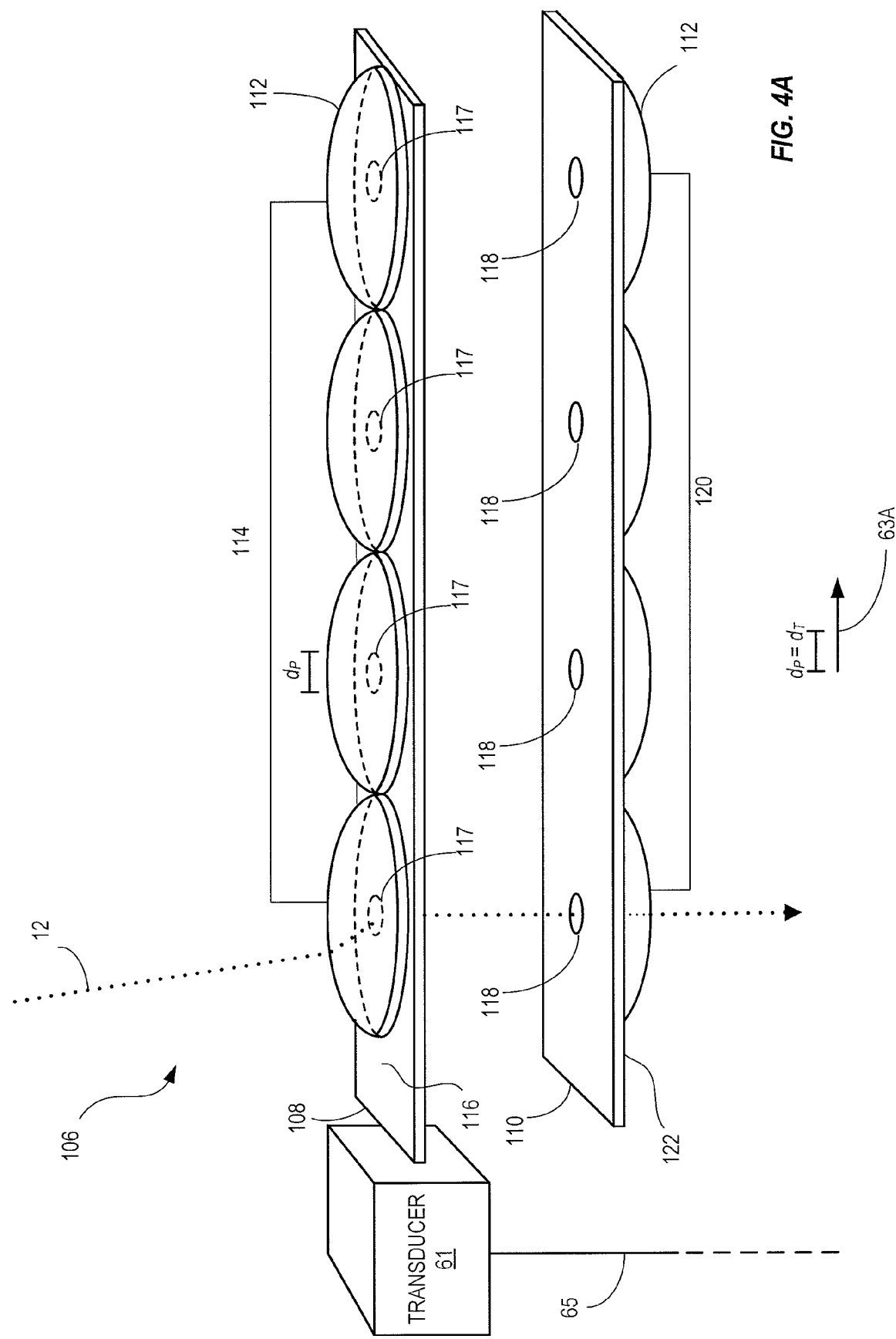
FIG. 4A is a perspective view of a shutter with dual lenslet arrays on first and second plates, in a transmissive mode.

For example, FIG. 4A shows shutter 106 with first plate 108 and second plate 110. First and second plates 108, 110 are for example formed of an optical material having an index of refraction selected for optimum performance with an intended wavelength or light source (e.g., infrared, LED, incandescent). Unlike shutter 100 using compound parabolic concentrators 62, shutter 106 uses lenslets 112, which may be etched into the optical material of plates 108, 110. Alternately, lenslets 112 may be printed onto glass plates 108, 110.

In particular, first plate 108 includes a first array of lenslets. In the embodiment of FIG. 4A, the concentrators are refractive lenslets 112. Although lenslets 112 may be lightweight and thin; to further reduce the weight and volume, Fresnel lenslets may be used. Other diffractive lenslets may also be combined with plates 108, 110, as a matter of design preference. First array of lenslets 112 (hereinafter, "first array 114") is on a top or front face 116 of first plate 108, each lenslet 112 over a pinhole. A first array of the pinholes (hereinafter, "first pinholes 117") is aligned with first array 114. First plate 108 is positioned opposite second plate 110. Second plate 110 includes a second array of pinholes (hereinafter, "second pinholes 118") and a second array of lenslets 112 (hereinafter, "second array 120") aligned with second pinholes 118 on a bottom or back face 122 of second plate 110. First and second pinholes 117, 118 are for example printed on glass, plastic or metal plates 108, 110. Lenslets 112 may be glass or plastic lenses printed upon plates 108, 110.

In FIG. 4A, shutter 106 is shown in transmissive mode. Electromagnetic radiation 12 entering first array 114 is focused through first pinholes 117, second pinholes 118 and out second array 120. The f-number at first array 114 is for example higher than the f-number at second array 120, allowing more light to be focused upon a detector, lens or camera sensor behind second array 120. In one embodiment, radiation 12 is focused through first pinholes 117 and second pinholes 118 by refractive power of first array 114, and slowed (e.g., focused into a more parallel beam) exiting second array 120, by refractive power of the second array 120. The f-number at first array 114 is for example higher than the f-number at second array 120, allowing more light to be focused upon a detector, lens or camera sensor behind second array 120. Transducer 61 again operates to move first plate 108 laterally (arrow 63A).

Transducer 61 may optionally, or additionally, move second plate 110. By shifting first plate 108 (or second plate 110) by a transition distance $d_T$, which is approximately equal to the diameter $d_P$ of one pinhole, transducer 61 switches between transmissive and shuttered modes. Shuttering may be achieved by shifting first plate 108 by $d_T$ in the direction indicated by arrow 63A, or opposite arrow 63A. The short distance $d_T$ required to move first plate 108 or second plate 110 lends to a quick and very efficient shutter.

Figure 4B:
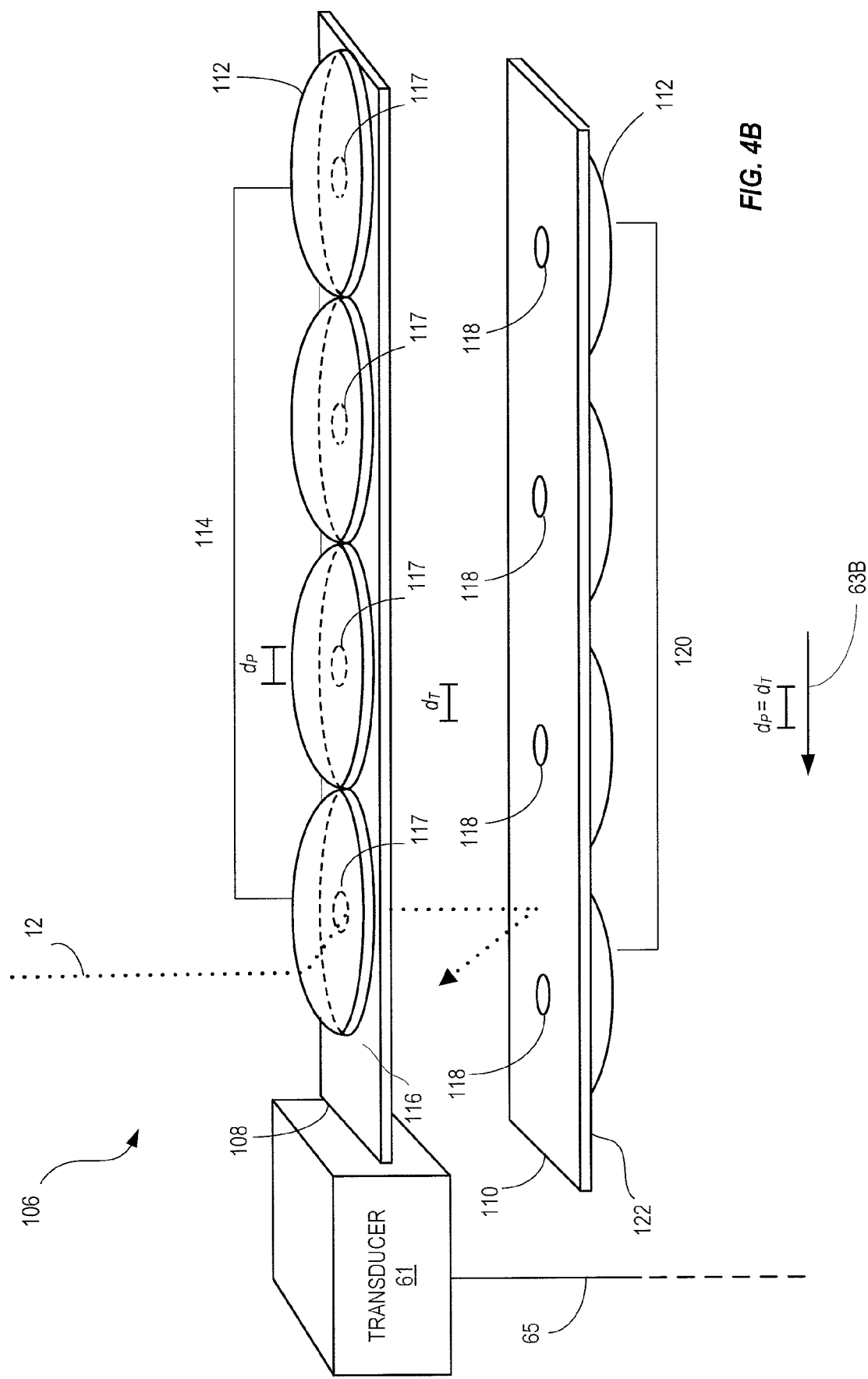
FIG. 4B is a perspective view of the shutter of FIG. 4A, in a shuttered mode.

In shuttered mode, shown in FIG. 4B, radiation 12 entering first array 114 and focused through first pinholes 117 is blocked from entering second pinholes 118 and second array 120. To switch back to transmissive mode, transducer 61 moves first plate 108 laterally by transition distance $d_T$. Lateral movement of first plate 108, for example, in the direction of arrow 63B by transition distance $d_T$, (approximately equal to the diameter $d_P$ of one pinhole) switches from shuttered mode to transmissive mode, as shown in FIG. 4A. The short distance $d_T$ required to move between modes facilitates quick and efficient shuttering.

For clarity of illustration, FIGS. 4A and 4B show plates 108, 110 (and thus pinholes 117, 118) separated from one another; however, it will be appreciated that plates 108, 110 may contact one another. For example, a pinhole 117 contacts plate 110 when shutter 106 is in shuttered mode, and "contacts" a pinhole 118 when shutter 106 is in transmissive mode. Additionally, it will be appreciated that shutter 106 may have a single array of pinholes. For example, shutter 106 may have one pinhole array (e.g., plate 108 with pinholes 117) in communication with transducer 61, with compound parabolic concentrators 62 (see FIGS. 3B-3D) in place of lenslets 112. Transducer 61 displaces the pinhole array to transmit light through the pinholes and through an aperture, for example (see, e.g., apertures 126A, 126B in FIGS. 5A-6), without transmission through a second pinhole array.

Figure 5A:
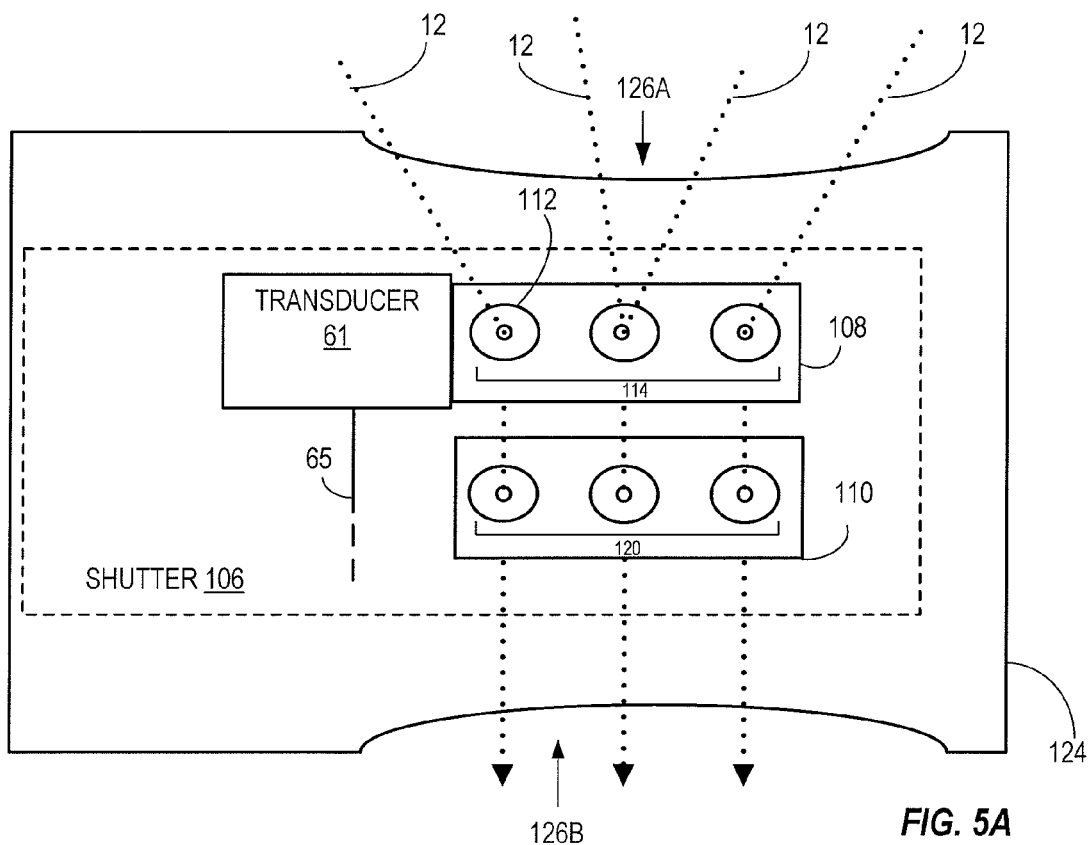
FIGS. 5A and 5B are schematic front views of the shutter of FIGS. 4A and 4B within a housing, in transmissive and shuttered modes.
Figure 5B:
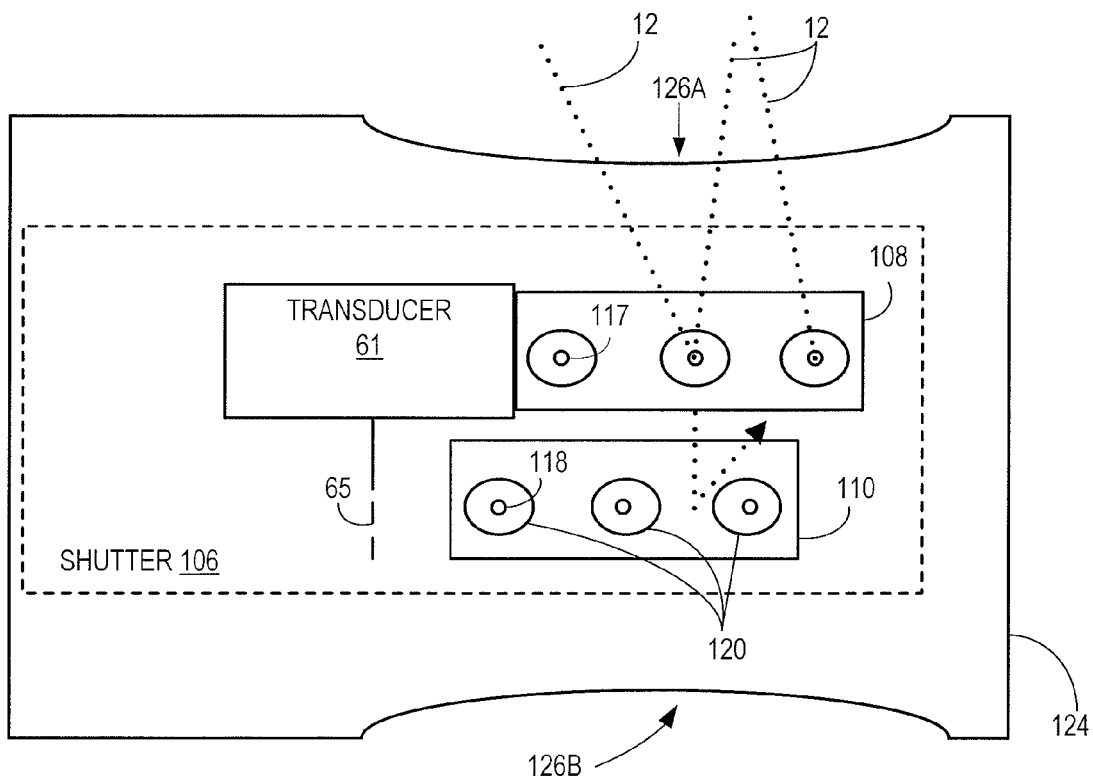
Figure 6:
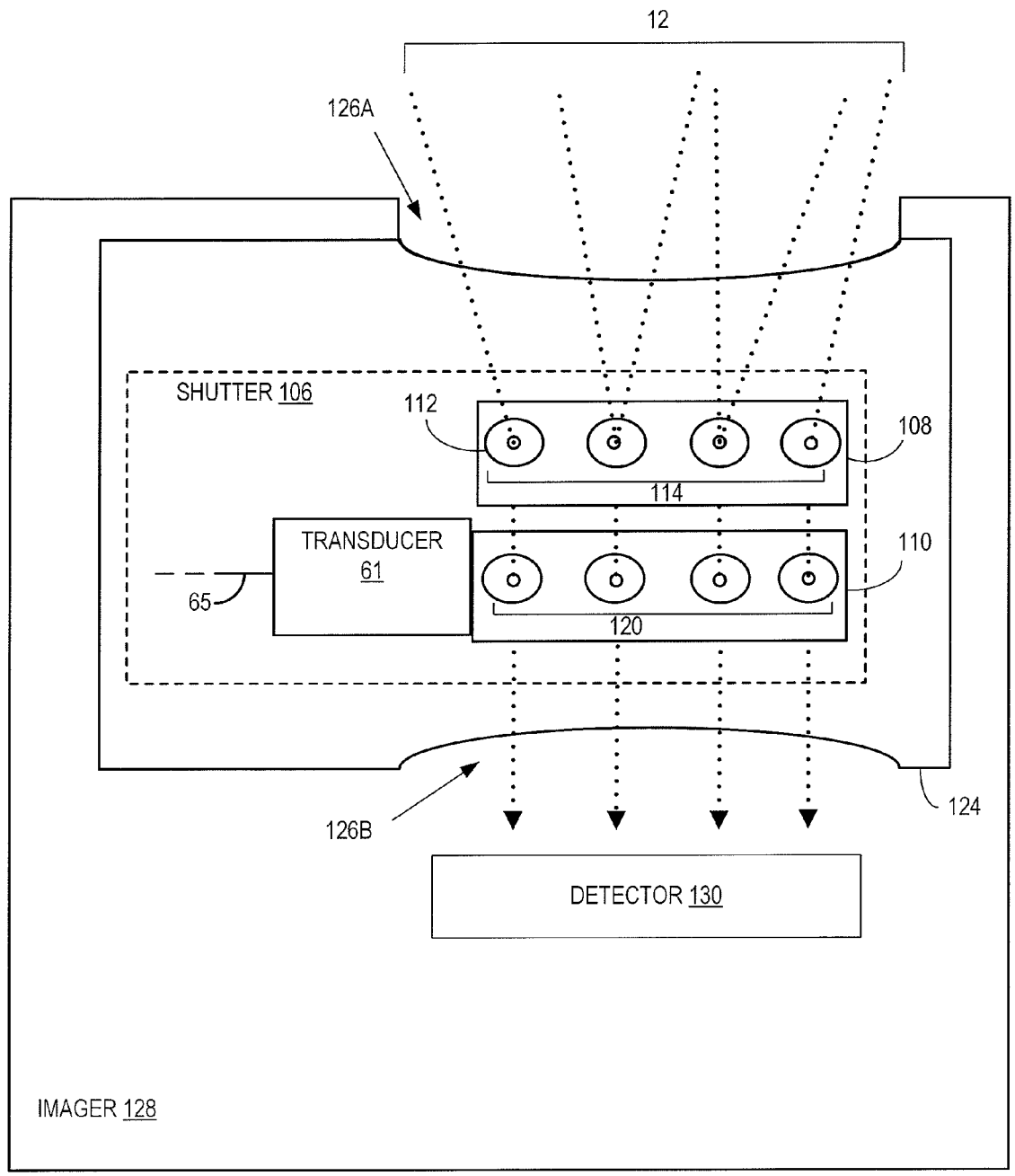
FIG. 6 is a schematic front view showing the shutter and housing of FIG. 4A, including an optical detector.

Shutter 106 may be provided within a housing 124, schematically shown in FIGS. 5A, 5B. Housing 124 includes one or more regions of aperture 126, shown in FIGS. 5A, 5B as top aperture 126A and bottom aperture 126B. Housing 124 may be provided within an imager 128, e.g., multi-mode optical imager 10, as shown schematically in FIG. 6. As shown in FIG. 6, when in transmissive mode, shutter 106 focuses incoming radiation 12 on a detector 130, which may correspond to detectors 26 or 32, described above. In transmissive mode, shutter 106 may also limit radiation impinging upon detector 130. For example, by directing light through pinholes, less overall light may reach detector 130 than if radiation 12 were allowed to strike detector 130 without intervening plate(s) and pinholes. Alternately, housing 124 and housing 36 (FIG. 2) may be one and the same, shutter 106 replacing or enhancing micro-optics (e.g., micro-optics 58) located on uncooled microbolometer array 48. It will be understood that shutter 100 may be substituted for shutter 106 as illustrated in FIGS. 5A-6.

Figure 7:
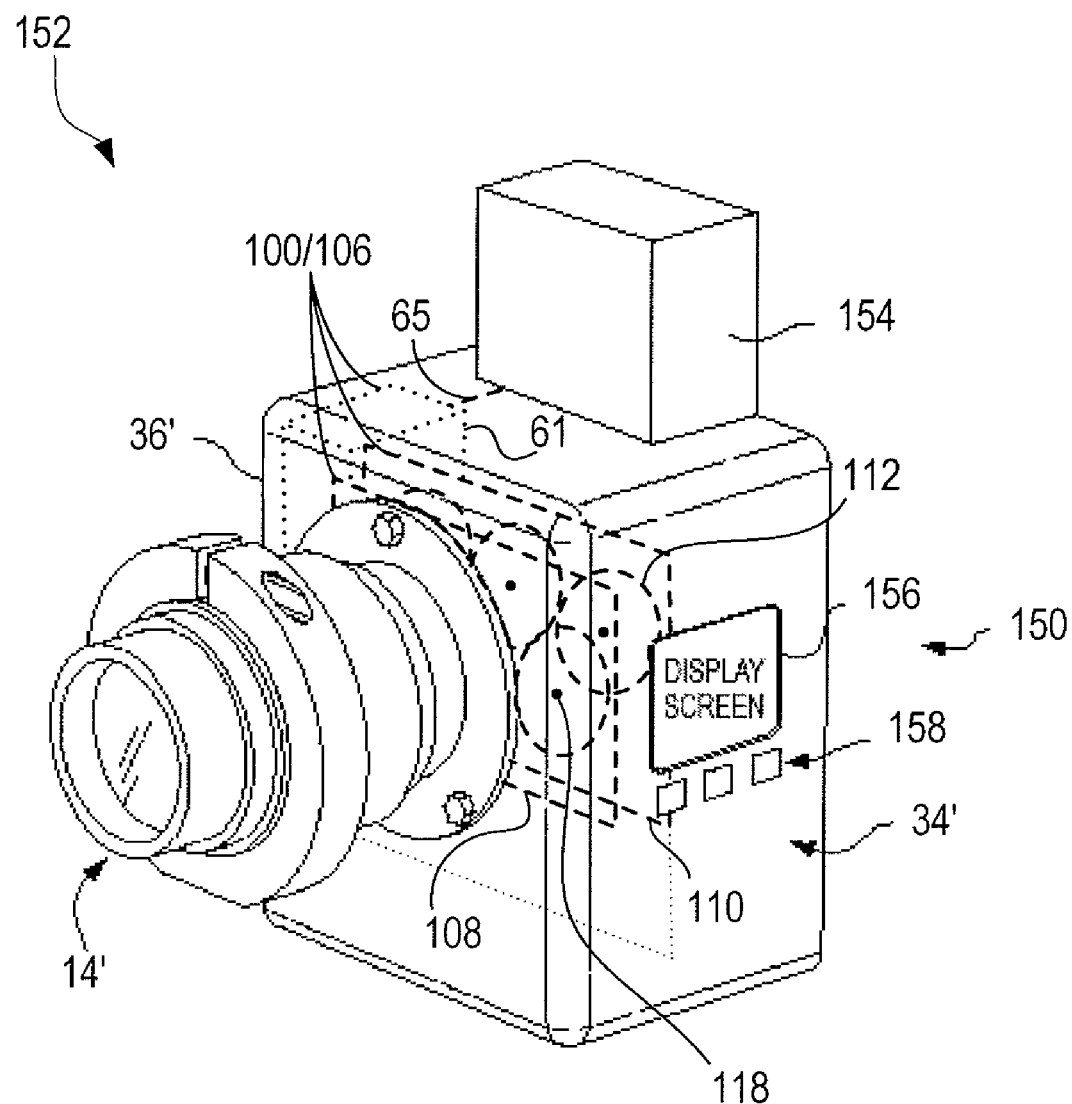
FIG. 7 is a perspective view of a camera employing the shutter of FIGS. 4A and 4B.

An exemplary multi-mode optical imager 150, having optical components similar to those of multi-mode optical imager 10 and shutter 100/106, is schematically shown in FIG. 7. Multi-mode optical imager 150 forms a camera 152, for example for capturing and imaging visible light and infrared wavelength bands. Fore-optics 14' are shown coupled to housing 36' of imaging module 34' (represented by a dotted line). Shutter 100/106 is shown encased in housing 36', with first and second plates 108, 110 and their respective components positioned between fore-optics 14' and imaging module 34'. Transducer 61 is shown in connection with electronics 154 (via control line 65) and coupled with second plate 110. Transducer 61 may be positioned elsewhere within housing 36'. Imaging module 34' may encase internal optics such as image splitter 16, first optical detector 26, f-number reducer 30 and second optical detector 32 of FIG. 1, for capturing visible light wavelength band 18 and infrared wavelength band 20, likewise of FIG. 1, to process and/or image multi-mode images. In one embodiment, shutter 100/106 is housed in front of these internal objects, within imaging module 34'.

Shutter 100/106 is for example actuated as described with respect to FIGS. 3C-5B. In transmissive mode, shutter 100/106 initiates image capture by allowing visible light and infrared wavelength bands to enter into imaging module 34'. Shutter 100/106 may be used for periodic calibration of the visible and IR detector arrays, or may be, for example, installed only in an IR channel (e.g., channel II, FIG. 1) to allow for calibration of the IR channel alone. Electronics 154 (e.g., a microprocessor) couple with first optical detector 26 and second optical detector 32 to process the detected images in visible light wavelength band 18 and infrared wavelength band 20, such that a visual representation of the detected images may be shown, for example, on a display screen 156. Display screen 156 may for example be an LCD display positioned on optical imager 150, though those skilled in the art will appreciate that display screen 156 may also be positioned remote to imager 150 as a matter of design choice. Display screen 156 may likewise show data related to shutter 100/106, for example, a shutter speed selected with input buttons 158. Input buttons 158 may also be positioned on optical imager 150 and coupled with electronics 154, such that user selections on input buttons 158 may guide image capture by optical imager 150 and the characteristics and functions of display screen 156 (e.g., display of images of visible light wavelength band 18 and/or infrared wavelength band 20, overlay a map to determine location of object emitting and/or reflecting electromagnetic radiation 12 detected by optical imager 150, etc.).

When provided within or coupled with imaging module 34, shutter 100/106 may become a core component for calibrating and shuttering multi-mode optical imagers. Shutter 100/106 may be provided with hyperspectral and other imagers described in U.S. Pat. No. 7,049,597, which is incorporated herein by reference. For example, shutter 100/106 may be used in combination with distance finders, laser rangers, targeting lasers, beam splitters or reflectors, GPS, rate sensors, military operations, software and other applications described in U.S. Pat. No. 7,049,597.

Figure 8:
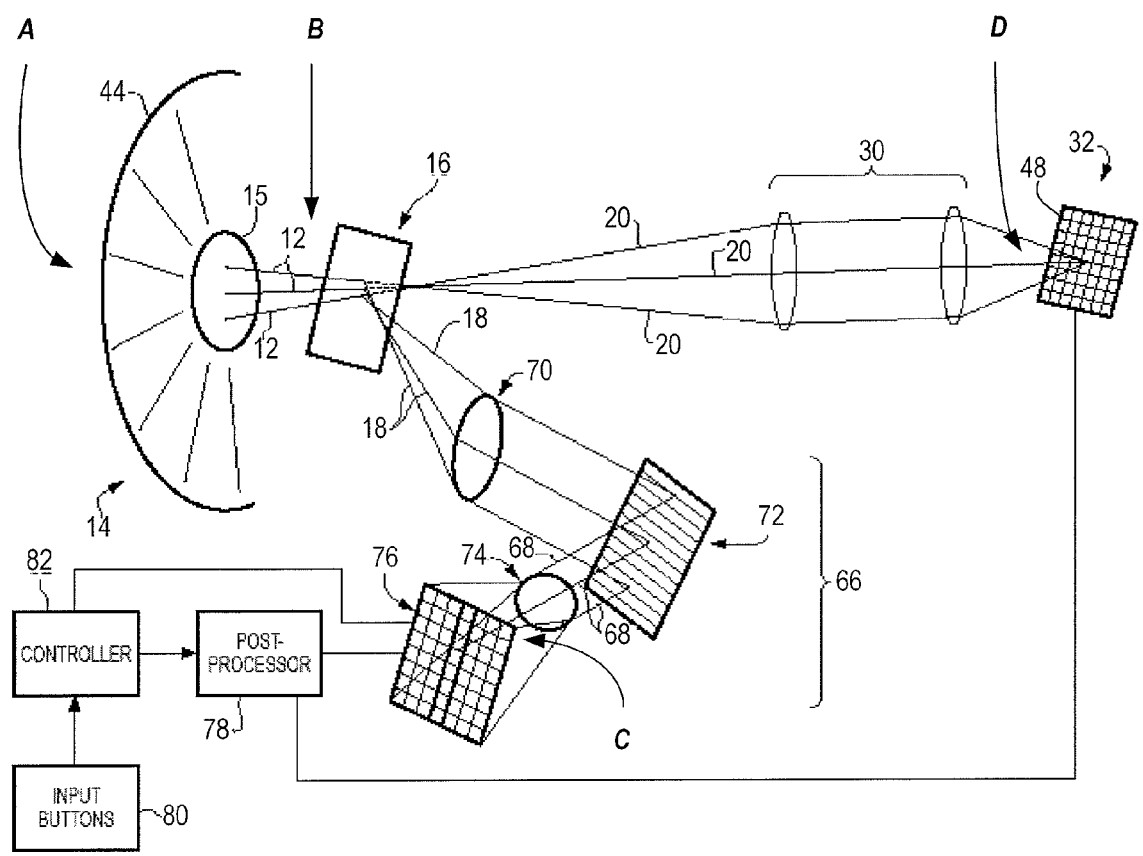
FIG. 8 is a diagram of a hyperspectral imager, showing exemplary positions for a shutter of FIGS. 3C-6.

For example, in one embodiment, shutter 100/106 may be used in combination with a hyperspectral imager as part of imaging module 34. FIG. 8 shows one such hyperspectral imager. Hyperspectral imager 66 provides spectral separation of visible light wavelength band 18 into a diffracted spectrum band 68, for high precision sensing of the visible light wavelength portion of the electromagnetic radiation 12 given off by an object in the field of view of multi-mode optical imager 10. Hyperspectral imager 66 includes: a collimator 70 that collimates visible light wavelength band 18 after splitting at beam-splitter 16; a dispersing element 72, such as a diffraction grating or a prism, that separates various wavelengths of radiation within visible light wavelength band 18 into diffracted spectrum band 68; and an imaging lens 74 that focuses diffracted spectrum band 68 onto a visible detector array 76 to capture and image diffracted spectrum band 68 of visible light. Shutter 100/106 may provide shuttering and calibration at various positions, for example before (position A) or after (position B) common aperture 15 or in front of detector array 76 (position C) or microbolometer array 48 (position D). Shutter 100/106 may likewise serve as f-number reducer 30. Detector array 76 may be one-dimensional, providing spectral separation of diffracted spectrum band 68, or may be two-dimensional, providing both spectral and spatial separation of band 68. In a similar way this may be applied to hyperspectral imaging in the infrared bands using an infrared detector array in place of the visible light detector array. Those skilled in the art appreciate that hyperspectral imager 66 may further include a slit or array of micro lenslets (e.g., at location 19) that reduce the field of view thereof. A post processor 78 may also be coupled with detector array 76 for analysis of the captured diffracted spectrum band 68 (post processor 78 may for example be incorporated with or within processor 52, FIG. 1). For example, such analysis by post processor 78 may include examining the particular visible light wavelengths detected to aid in determining the chemical composition of an imaged object. Processor 78 may further control transducer 61 via control line 65. Additional information can be obtained about the imaged object by coupling second optical detector 32 detecting infrared wavelength band 20 to post processor 78. By, for example, overlaying the detected image of infrared wavelength band 20 with the detected image of visible light wavelength band 18, the visual picture of the imaged object may be obtained while also viewing the heat signature (i.e., infrared radiation) emitted and/or reflected by the object. The overlaying of bands 18, 20 provides the feature of, for example, visual and thermal imaging (i.e., visual picture and heat signature). Visual and thermal imaging may be used to provide day/night target detection. Thus, with multiple waveband imaging, superior target detection is achieved because a range of ambient conditions (e.g., high/low levels of visible light) will not defeat the imaging abilities of imaging module 34.

To further control hyperspectral imagery, imaging module 34 may be provided with input buttons 80, similar to input buttons 158 of FIG. 6, and a controller 82, such as a microprocessor, to direct the processing by post-processor 78 according to user input to buttons 80. Controller 82 may also control detector array 76 (and/or other detectors of imaging module 34), including, for example, shuttering operations of imager 34 (by controlling shutter 100/106). Controller 82 may be incorporated with or within post-processor 78 as a matter of design choice. If a user desires to have information about an imaged object, one or more input buttons 80 may be depressed to instruct controller 82 to direct the processing by post-processor 78 of an image captured by hyperspectral imager 66. For example, post-processor 78 may be pre-programmed digitally with automatic target recognition (ATR) to identify a certain object (e.g., a tank) depending on the types of visible spectral bands within visible light wavelength band 18 that are detected by detector array 76. Upon the user depressing one or more of input buttons 80, controller 82 directs hyperspectral imager 66 to detect the visible light wavelength band 18, and second optical detector 32 to detect the infrared wavelength band 20, such that the images may be viewed on, for example, a display screen (i.e., display screen 156). The image may, of course, include still pictures or a stream of video pictures (e.g., MPEG) captured by multi-mode optical imager 10. Further identification or enhanced recognition of imaged objects may be achieved by processing the image detected by second optical detector 32 and, for example, overlaying the image with the image captured by hyperspectral imager 66. Likewise, a user wishing to check or adjust shutter operations, such as shutter speed, may do so by pressing one or more associated input buttons 80.

Figure 9:
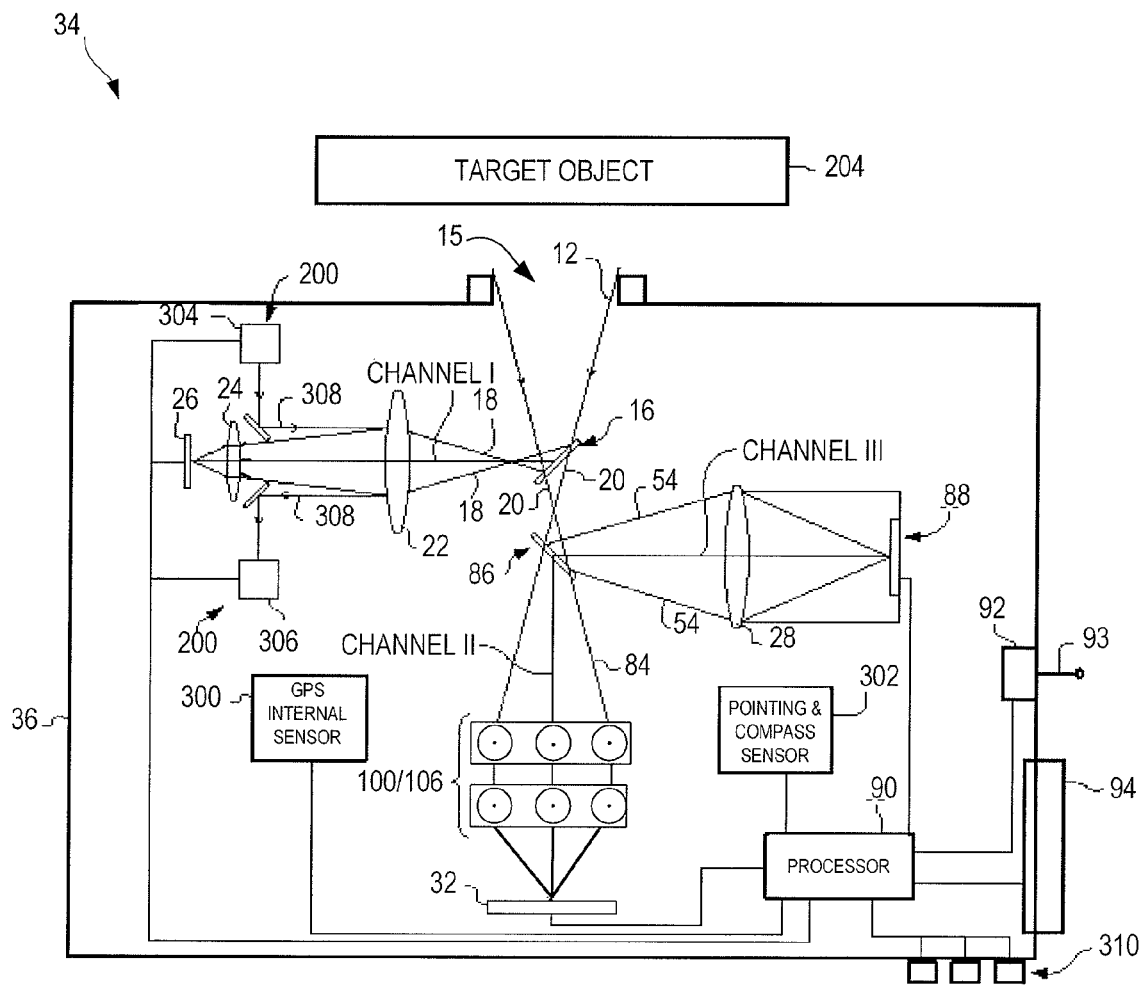
FIG. 9 is a schematic illustration of a multi-channel imaging module employing a shutter of FIGS. 3C-6.

Imaging module 34 is shown in FIG. 9 to have channel I along which visible light wavelength band 18 is aligned, channel II along which a longwave infrared wavelength band 84 is aligned, and channel III along which midwave infrared wavelength band 54 is aligned. Electromagnetic radiation 12 is first split by beam splitter 16 into visible light wavelength band 18 and infrared wavelength band 20; infrared wavelength band 20 travels to a second beam splitter 86 dividing infrared wavelength band 20 into long-wave infrared wavelength band 84 and midwave infrared wavelength band 54. Distance finder 200, in the form of output and input laser rangers 304, 306 in FIG. 9, sends and receives, respectively, laser signals 308 partially along channel I with visible light wavelength band 18. Visible light wavelength band 18 encounters first field lens 22 and one or more zoom lenses 24 to focus a visible image of radiation onto first optical detector 26, in a similar fashion to multi-mode optical imager 10 of FIG. 1. Along channel III, midwave infrared wavelength band 54 travels through second lens 28, which focuses band 54 onto an MWIR detector array 88 (e.g., an InSb array) for detection thereof. A cold shield 56 extends between lens 28 and the MWIR detector array 88, as described in FIG. 2. In channel II, shutter 100/106 shutters and reduces f-number of the long-wave infrared wavelength band 84, for example to match the f-number of the second optical detector 32, such as uncooled microbolometer array 48. For ease of illustration, not all components of shutter 100/106 are shown in FIG. 9.

Shutter 100/106 may also be used in connection with lenses 22, 24, 28 or at aperture 15. An output laser ranger 304, an input laser ranger 306, first optical detector 26, MWIR detector array 88 and uncooled microbolometer array 48 may all couple with a controller or processor 90, as shown. Processor 90 may perform post-processing on images detected by first optical detector 26, second optical detector 32, and MWIR detector array 88 for display for a user on a display screen 94 coupled with processor 90. Processor 90 may also process data from output laser ranger 304, and input laser ranger 306, and utilize (a) a GPS determined location of imaging module 34 relative to the earth, and (b) sensed data from orientation sensors (e.g., pointing and compass sensor 302) to determine the location of target object 204. A wireless transmitter 92 and antenna 93 may couple with processor 90 to transmit captured image data, distance from target object data, GPS location of imaging module 34, and/or location of target object 204, to remote receivers, such as an intelligence command center at a military base, as further described in U.S. Pat. No. 7,049,597.

Figure 10:
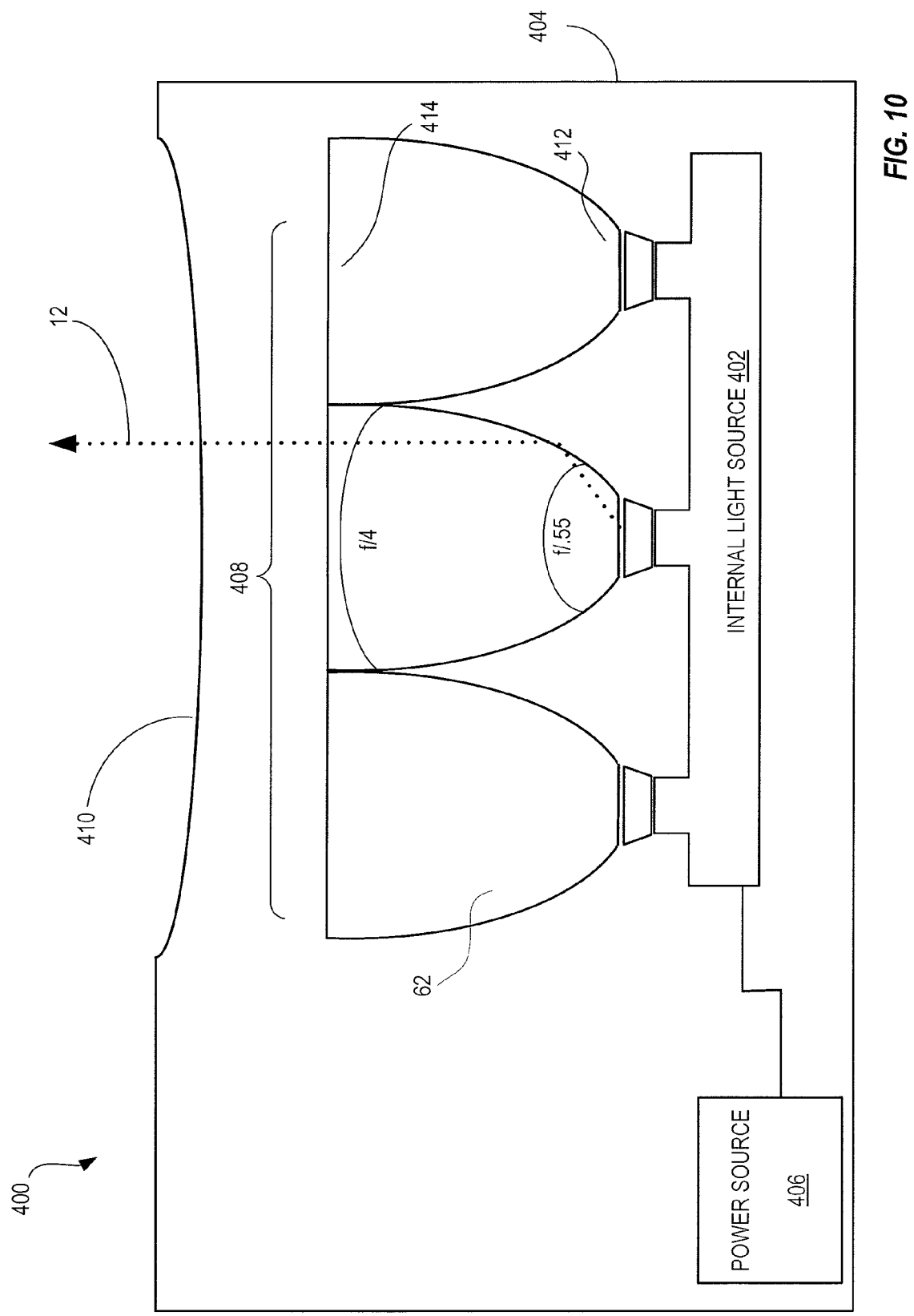
FIG. 10 is a front-view diagram of limited f-cone radiation source.

FIGS. 10-13 illustrate use of shutters 100, 106 in a limited f-cone light or radiation source 400. FIG. 10 is a simplified diagram of limited f-cone light or radiation source 400. Source 400 includes an internal light or radiation source 402, shown disposed within a housing 404. Internal source 402 is for example an LED, a filament, a blackbody emitter, an incandescent filament or a flat plate emitter. A power source 406, for example a battery, powers internal source 402. An array 408 of concentrators, for example compound parabolic concentrators 62, captures radiation 12 from internal source 402 for quasi-collimated transmission through an aperture 410. Array 408 increases f-number of radiation 12 from internal light source 402 to aperture 410. F-number is for example increased (slowed) from about 0.55 at a first end 412 of concentrators 62 to about 4.0 at a second end 414 of concentrators 62. Radiation 12 thus leaves limited f-cone source 400 as a more collimated beam (e.g., having a smaller f-cone than radiation emitted from source 402).

Figure 11:
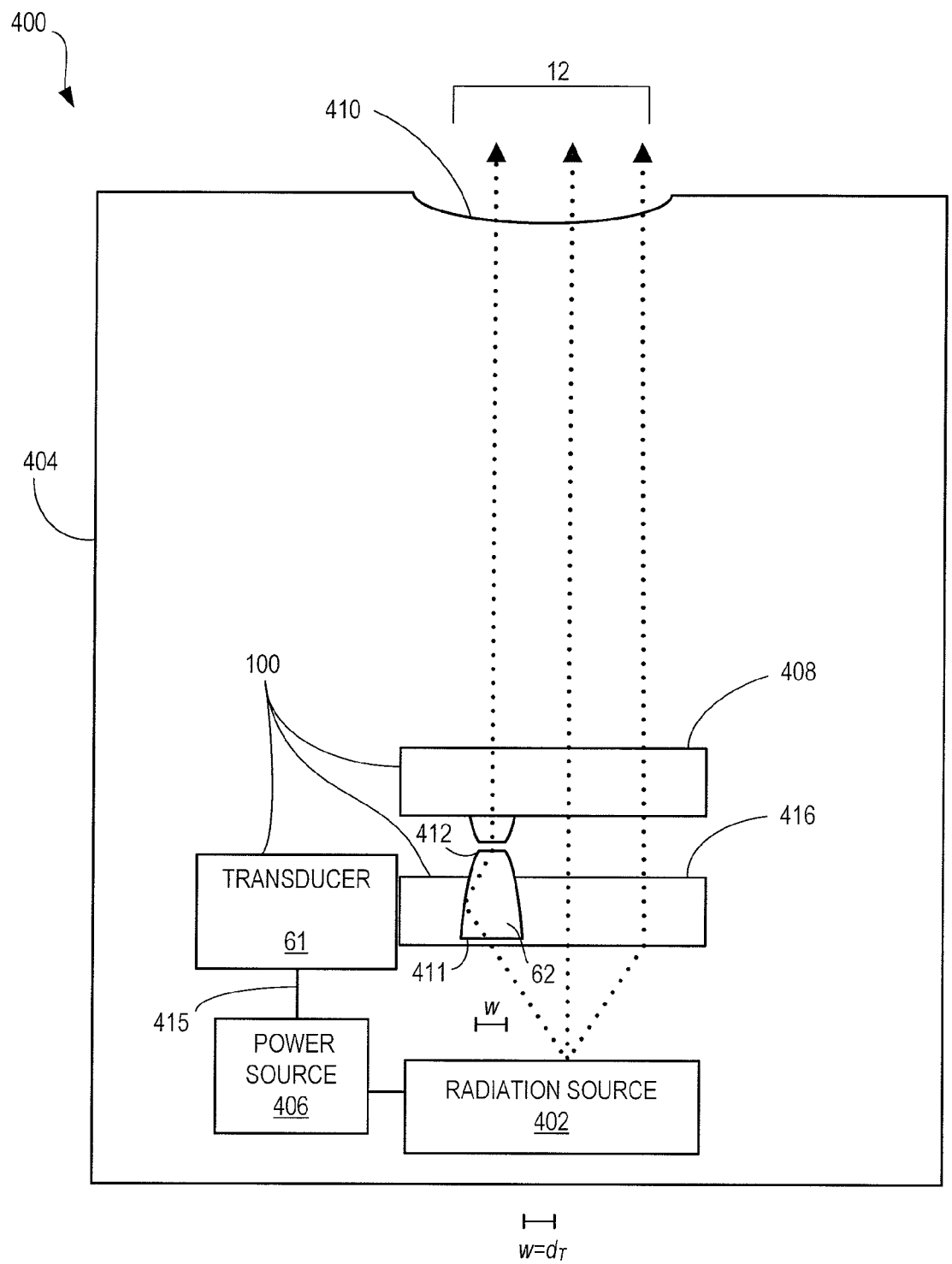
FIG. 11 is a front-view diagram of the limited f-cone radiation source of FIG. 10, with the shutter of FIGS. 3C and 3D.

As shown in the simplified view of FIG. 11, f-cone reduction may be combined with the efficient shuttering capabilities described herein above. In particular, FIG. 11 shows concentrator array 408 of FIG. 10, along with a second concentrator array 416. One or both of arrays 408, 416 couple with transducer 61 to form shutter 100. Power source 406 couples with transducer 61, e.g., via connection 415, to move array 408 and/or array 416 laterally. Transducer 61 is for example a piezo-electric element that expands and contracts to move array 408 or 416 responsive to voltages supplied by connection 415. Control line 65 may connect with a processor (not shown) that controls shuttering responsive to user commands. Switching between shuttered and transmissive modes is achieve by moving array 408 or array 416 to the right or left (as depicted in FIG. 11) by a distance equal to the width w of first end 412. The transition distance $d_T$ between transmissive mode (shown) and shuttered mode is thus about equal to width w.

Figure 12:
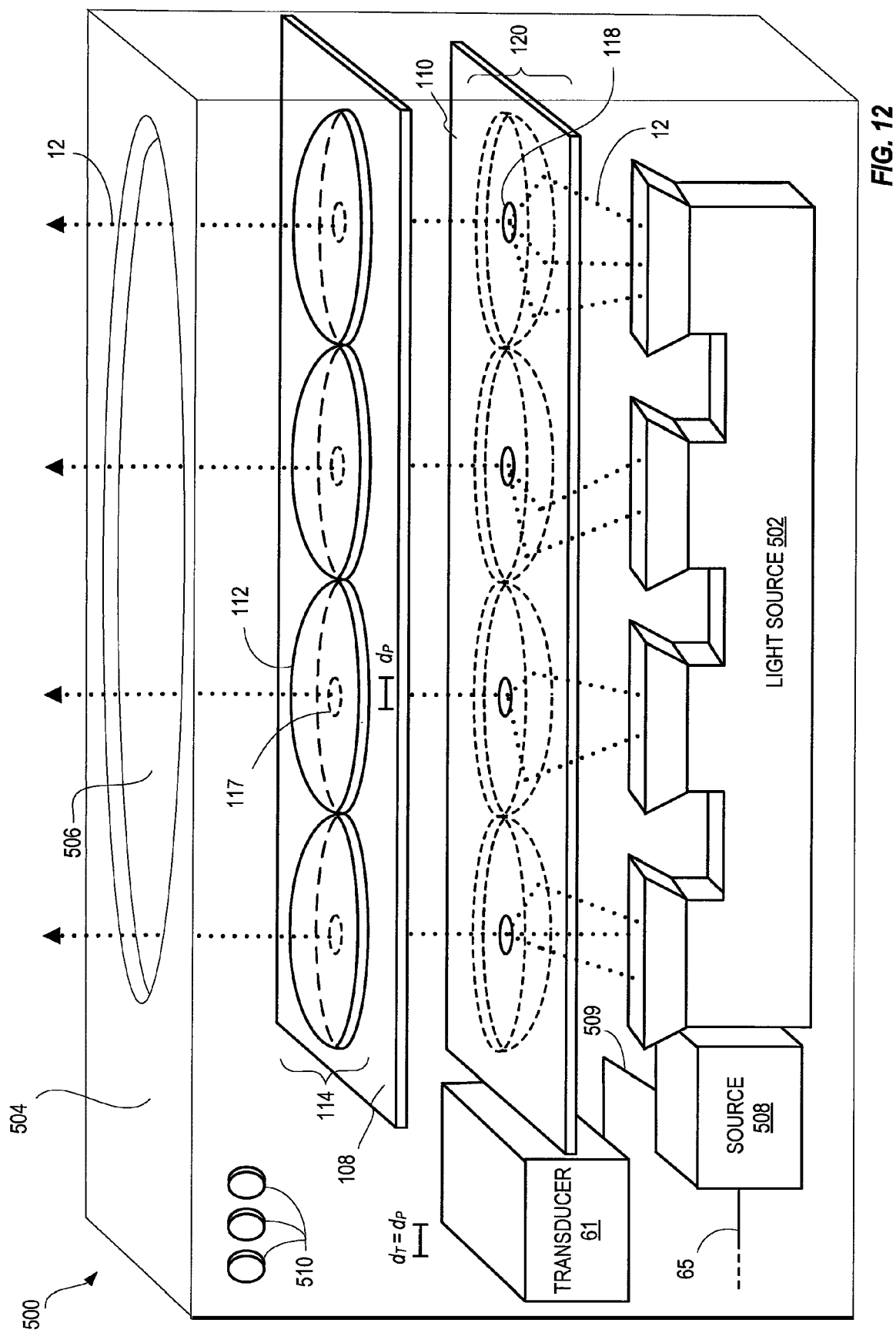
FIG. 12 is a perspective view of a limited f-cone light source as in FIG. 10, with the shutter of FIGS. 4A-6.

FIG. 12 provides a perspective view of a limited f-cone light source 500 with shutter 106 (for ease of illustration, shutter 106 is not specified, however, given the above discussion, it will be understood that shutter 106 may include first and second plates 108, 110; lenslets 112 arranged in first and second arrays 114, 120; first and second pinholes 117, 118 and transducer 61, as described with respect to FIGS. 4A and 4B). When in transmissive mode (shown), shutter 106 receives radiation 12 from an internal light source 502 and directs radiation 12 out of a housing 504, via an aperture 506. Power source 508 powers transducer 61 (via connection 509). For example, responsive to input from a control line 511, power source 508 provides a voltage via connection 509, causing transducer 61 to shift plate 108 or 110. In the embodiment of FIG. 12, shuttering is achieved when transducer 61 moves second plate 110 laterally (left or right) by a distance equal to the diameter $d_P$ of a pinhole 116 (of first pinholes 117 or second pinholes 118). User interface buttons 510 may be provided, for example to allow selection of shutter speed or to turn limited f-cone light source 500 on or off. For ease of illustration, certain connections between user interface buttons 510 and power source 508 and transducer 61 (and between power source 508 and internal light source 502) are not shown. Likewise, it will be appreciated that although FIG. 12 shows linear arrays 114, 120 with linear pinholes 117 and 118, two-dimensional arrays of lenslets or other concentrators may be utilized with light source 500. In addition, it will be understood that shutter 106 may limit or slow radiation passed from light source 502 through aperture 506 without utilizing shuttering mode, by focusing through pinholes.

Since certain changes may be made in the above systems without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A micro-optic shutter, comprising:
   micro-optics having a first array of concentrators and a second array of concentrators; and
   a transducer for laterally displacing at least one of the first and second concentrator arrays between a transmissive mode and a shuttered mode, wherein in the transmissive mode the arrays of concentrators are optically aligned to pass electromagnetic energy through the micro-optics, and wherein in the shuttered mode the micro-optics blocks the electromagnetic radiation from passing therethrough.

2. The shutter of claim 1, the concentrators of the first and second arrays comprising reflective concentrators each having a compound-parabolic shape.

3. The shutter of claim 1, the micro-optics comprising an array of hollow tapered capillaries.

4. The shutter of claim 3, each hollow tapered capillary comprising a reflective coating on an inner surface thereof.

5. The shutter of claim 1, the micro-optics comprising one or more of: a fiber optic taper and reflective elements.

6. The shutter of claim 1, further comprising a housing encasing the micro-optics and the transducer, except for at least one region of aperture.

7. The shutter of claim 1, the transducer comprising a piezo-electric element responsive to a control signal to displace the first or the second array laterally between the transmissive mode and the shuttered mode.

8. The shutter of claim 1, one or both of the first and second arrays comprising a plate for supporting the array, the plate coupled with the transducer.

9. The shutter of claim 1, the concentrators of the first and second arrays comprising refractive concentrators, the micro-optics comprising:
   a first plate forming a first array of pinholes extending therethrough, the first array of concentrators supported on the first plate and over the first pinhole array; and
   a second plate forming a second array of pinholes extending therethrough, the second array of concentrators supported on the second plate and under the second pinhole array;
   wherein the first and second plates are aligned in the transmissive mode and unaligned in the shuttered mode.

10. The shutter of claim 9, wherein the transducer laterally displaces the first or the second plate by the diameter of one of the pinholes, to shift between the transmissive and the shuttered modes.

11. A micro-optic shutter, comprising:
   a first plate forming a first array of pinholes extending therethrough and a corresponding array of first refractive lenslets adjacent the first array of pinholes;
   a second plate forming a second pinhole array extending therethrough and a corresponding array of second refractive lenses on a second side of the second plate and beneath the second pinholes; and
   a transducer for laterally displacing one of the first and second plates between a transmissive mode and a shuttered mode, wherein, in the transmissive mode, electromagnetic energy focuses through the first and second array of pinholes by refractive power of the first refractive lenses, and, in the shuttered mode, the electromagnetic energy is blocked in transmission through the arrays of lenses by one or both of the plates.

12. The shutter of claim 11, the first and second plates comprising glass.

13. The shutter of claim 11, the first and second array of lenses being printed upon the first or second plates.

14. The shutter of claim 13, the printed lenses comprising plastic.

15. The shutter of claim 1, the micro-optics comprising one or more refractive lens elements.

16. The shutter of claim 1, wherein the micro-optics are positioned adjacent a source for emitting radiation in a limited f-cone light source; the transducer shifting one of the first and second concentrator arrays between the transmissive mode and the shuttered mode, to shutter the source.

17. The shutter of claim 16, wherein in the transmissive mode the arrays of concentrators are optically aligned to permit radiation from the source that passes through the first array of concentrators to pass through the second array of concentrators, and wherein in the shuttered mode the radiation is blocked from passing through the second array of concentrators.

18. The shutter of claim 8, the source for emitting radiation selected from the group of an LED, a filament, a blackbody emitter, and incandescent filament and a flat plate emitter.

19. The shutter of claim 8, the concentrators of the first and second arrays comprising reflective concentrators.

20. The shutter of claim 12 one or both of the first and second array of lenses being etched into the glass.

* * * * *